(12) United States Patent
Hiraoka et al.

(10) Patent No.: US 6,429,280 B1
(45) Date of Patent: Aug. 6, 2002

(54) PROCESS FOR PREPARING POLYHYDROXYCARBOXYLIC ACID

(75) Inventors: Shouji Hiraoka; Hitoshi Tsuboi; Masayuki Sakai, all of Yamaguchi (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/763,242

(22) PCT Filed: Jun. 22, 2000

(86) PCT No.: PCT/JP00/04069

§ 371 (c)(1),
(2), (4) Date: Feb. 20, 2001

(87) PCT Pub. No.: WO00/78840

PCT Pub. Date: Dec. 28, 2000

(30) Foreign Application Priority Data

| Jun. 22, 1999 | (JP) | ............ 11-174921 |
| Jun. 22, 1999 | (JP) | ............ 11-174922 |
| Aug. 13, 1999 | (JP) | ............ 11-229186 |

(51) Int. Cl.[7] .................. C08G 63/08; C08F 6/00
(52) U.S. Cl. ............ 528/354; 528/361; 528/503
(58) Field of Search ............... 528/354, 361, 528/503

(56) References Cited

U.S. PATENT DOCUMENTS

| 4,161,578 A | * | 7/1979 | Herron | |
| 5,770,683 A | * | 6/1998 | Yoshida et al. | ............ 524/589 |
| 5,880,254 A | * | 3/1999 | Ohara et al. | ............ 528/483 |
| 6,114,495 A | * | 9/2000 | Kolstad et al. | ............ 525/413 |

FOREIGN PATENT DOCUMENTS

| EP | 0 500 098 A | * | 8/1992 |
| EP | 0 953 489 A | * | 11/1999 |
| JP | 8-193124 | | 7/1996 |
| JP | 8-269175 | | 10/1996 |

* cited by examiner

Primary Examiner—Samuel A. Acquah
(74) Attorney, Agent, or Firm—Burns, Doane, Swecker & Mathis, L.L.P.

(57) ABSTRACT

A process for preparing a polyhydroxycarboxylic acid having a weight average molecular weight of 50,000 to 1,000,000, which comprises a crystallizing step comprising (A) a step of heating pellets of a polyhydroxycarboxylic acid having a weight average molecular weight of 2,000 to 100,000 under stirring to a temperature from glass transition point or higher to a melting point or lower and heating until a defined result is attained, and (B) a step of heating the polyhydroxycarboxylic acid to a temperature of solid phase polycondensation reaction temperature, and a solid phase polycondensation reaction step of reacting the crystallized polyhydroxycarboxylic acid at an endothermic start temperature or lower of an endothermic peak as recognized upon temperature elevation analysis of the crystallized polyhydroxycarboxylic acid by using a differential scanning calorimeter.

21 Claims, 2 Drawing Sheets

PROCESS FOR PREPARING POLYHYDROXYCARBOXYLIC ACID

TECHNICAL FIELD

This invention concerns a process for preparing a polyhydroxycarboxylic acid and, more specifically, it relates to a process for preparing a polyhydroxycarboxylic acid comprising a step of heating to crystallize pellets of a polyhydroxycarboxylic acid under a specified condition and a step of solid phase polycondensation thereof under a specified condition.

BACKGROUND ART

1. Technical Background

In recent years, disposal of wastes has provided problems in relation with environmental preservation. Particularly, molding products and processed products of generally used polymeric materials bring about problems in that they are not biologically degraded or disintegrated when filled as wastes but remain substantially permanently as obstacles and, further, additives such as plasticizers are leached to contaminate environments.

Further, it has been closed up more and more in recent years that when they are burnt as the wastes, high heat calorie generated from combustion damages furnaces and discharged smokes and gases generated by combustion may possibly cause atmospheric pollution, destruction of ozone layers, global warming and acid rain.

In view of the situations described above, a demand has been increased for such polymeric materials that are decomposable when filled as wastes after the use although they are tough and strong, or give less combustion heat when they have to be burnt and do not damage the furnaces. However, it can not be said that polymeric materials capable of satisfying such a demand are easily available at present.

By the way, polyhydroxycarboxylic acids can be mentioned, for example, as those capable of satisfying the demand described above. Among them, polylactic acid as a kind of the polyhydroxycarboxylic acids has high transparency, high strength and has an easily hydrolyzable characteristic under the presence of water and, when it is used as the general-purpose resin, it is decomposed without contaminating the environment after disposal, thus gentle to the environment. Further, a case of being dwelt in a living body as a medical material, it can be decomposed and absorbed in the living body giving no toxicity to the living body after attaining the purpose, so that such excellent natures gentle to the living body has already been noted prior to the filing of this application. For example, Japanese Open-Laid Patent Application No. Hei 5-255488 discloses a preparation method of using a so-called solid phase polymerization, of conducting polycondensing reaction for polyhydroxycarboxylic acids (so-called low molecular weight polymer) below the melting point thereof.

2. Problems in the Prior Art

By the way, in the prior art, it is prepared by way of a solid phase polycondensation reaction using a polyhydroxycarboxylic acid of low molecular weight obtained by a liquid phase polycondensation step. However, since the polyhydroxycarboxylic acid obtained by the liquid phase polycondensation reaction has a low molecular weight, it is less crystallizable and may cause blocking or fusion when used as it is to the solid phase polycondensation reaction step. In view of the above, a crystallizing step is disposed before the solid phase polycondensation reaction step and, after heating to crystallize the polyhydroxycarboxylic acid by way of the liquid phase polycondensation reaction step, it is used for the solid phase polycondensation reaction step.

However, for rapid conduction of the crystallizing step, when the temperature is elevated rapidly or heating is effected at high temperature, since blocking or fusion of the polyhydroxycarboxylic acid pellets takes place in the system, a relatively moderate temperature elevation condition has to be adopted. As a result, the productivity can not be improved as intended, so that a preparation method of more economical performance and excellent in productivity has been demanded.

Further, since the polyhydroxycarboxylic acid used for the solid phase polycondensation reaction has low molecular weight and has low melting viscosity, particles of uniform shape can not be obtained by a strand cut system, underwater cut system or hot cut system used in the pelleting of usual polymers.

The polyhydroxycarboxylic acid of low molecular weight can not be formed into pellets but has to be handled in the shape of a fine powder such as powders or flakes. That is, the powdery form is difficult to be handled with, preparation of a polyhydroxycarboxylic acid of high molecular weight by the solid phase polycondensation reaction in an economical preparation process is difficult, as well as the processing stability was poor since the fine powder can not be supplied stably to molding machines.

Accordingly, an object of the invention is to overcome the foregoing problems in the prior art and provides a process for preparing a polyhydroxycarboxylic acid of high molecular weight efficiently.

DISCLOSURE OF THE INVENTION

The present inventors have made an earnest study for solving the foregoing subject and, as a result, have found conditions capable of efficiently preparing a polyhydroxycarboxylic acid of high molecular weight for the process for preparing a polyhydroxycarboxylic acid of high molecular weight, with no blocking or fusion of pellets of the polyhydroxycarboxylic acid of low molecular weight in the system, by way of a step of heating to crystallize pellets of a polyhydroxycarboxylic acid of low molecular weight under a specified condition and, successively, a step of conducting solid phase polycondensation reaction under a specified condition.

Further, it has been found that the crystallizing step and the solid phase polycondensation reaction step can be conducted efficiently when the pellet of a polyhydroxycarboxylic acid of low molecular weight used in the crystallizing step and the solid phase polycondensation reaction step has a special form or specified layer structure obtained under the specified preparation conditions.

As the result, the invention has been accomplished.

That is, this invention provides the following features (1) to (7).

(1) A process for preparing a polyhydroxycarboxylic acid of high molecular weight having a weight average molecular weight of 50,000 to 1,000,000, comprising a crystallizing step of heating to crystallize a polyhydroxycarboxylic acid of low molecular weight obtained by a liquid phase polycondensation reaction step and a solid phase polycondensation reaction step of heating to a temperature not lower than the crystallizing temperature in which the crystallizing step comprises:

(A) a step of heating pellets of a polyhydroxycarboxylic acid having a weight average molecular weight of 2,000 to 100,0000 under stirring at a temperature not lower than the glass transition point and not higher than the melting point, and heating the same till an exothermic peak area corresponding to the heat of crystallization of at most 10 J/g or less and an endothermic peak area corresponding to the heat of melting of 38 J/g or more as recognized upon conducting temperature elevation analysis of the polyhydroxycarboxylic acid by using a differential scanning calorimeter and, successively, (B) a step of heating to elevate the temperature of the polyhydroxycarboxylic acid to a temperature for the solid phase polycondensation reaction and the solid phase polycondensation reaction step comprises:
a step of conducting solid phase polycondensation of the polyhydroxycarboxylic acid at the temperature not higher than the start temperature of the endothermic peak as recognized upon conducting temperature elevation analysis of the polyhydroxycarboxylic acid by using a differential scanning calorimeter.

(2) A process for preparing a polyhydroxycarboxylic acid having a weight average molecular weight of 50,000 to 1000,000 as defined in (1) above, wherein the average particle size of the pellet of the polyhydroxycarboxylic acid before crystallization is within a range from 0.1 mm to 20 mm and the standard deviation of the particle diameter is within 1 mm.

(3) A process for preparing a polyhydroxycarboxylic acid having a weight average molecular weight of 50,000 to 1000,000 as defined in (1) or (2), wherein the pellets of the polyhydroxycarboxylic acid before crystallization are pellets of particulate polyhydroxycarboxylic acid prepared by melting a polyhydroxycarboxylic acid having a weight average molecular weight of 2,000 to 100,000, and dropping and cooling to solidify the molten polyhydroxycarboxylic acid having a melting viscosity of 0.01 to 100 poise.

(4) A process for a preparing polyhydroxycarboxylic acid having a weight average molecular weight of 50,000 to 1000,000 as defined in (3) above wherein the melting temperature is from 140° C. to 200° C.

(5) A process for preparing a polyhydroxycarboxylic acid having a weight average molecular weight of 50,000 to 1000,000 as defined in (1) above, wherein the pellet of the polyhydroxycarboxylic acid before crystallization is a pellet comprising (1) a inner core portion and (2) an outer coating portion covering the inner core portion, in which (I) the inner core portion comprises a resin containing a polyhydroxycarboxylic acid having a weight average molecular weight (Mw) within a range from 2,000 to 30,000 and (II) the outer coating portion comprises a resin containing a polyhydroxycarboxylic acid having a weight average molecular weight (Mw) of 30,000 to 100,000, in which the resin constituting the inner core portion has a melting point lower than that of the resin constituting the outer coating portion or shows no melting point.

(6) A process for preparing a polyhydroxycarboxylic acid having a weight average molecular weight of 50,000 to 1000,000 as defined in any one of (1) to (5) above, wherein the hydroxy-carboxylic acid is an aliphatic hydroxycarboxylic acid.

(7) A process for preparing a polyhydroxycarboxylic acid having a weight average molecular weight of 50,000 to 1000,000 as defined in (6) above, wherein the aliphatic hydroxy-carboxylic acid contains lactic acid.

BRIEF DESCRIPTION OF THE DRAWINGS

Explanation for References
(1) . . . inner core portion
(2) . . . outer coating portion

Figure 1:
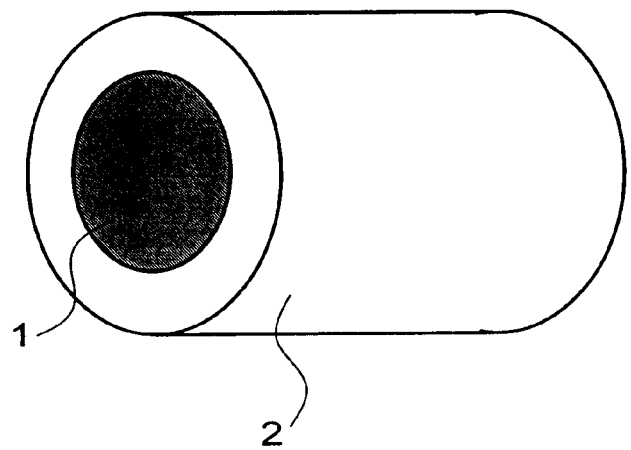
FIG. 1 shows a schematic perspective view of a polyhydroxycarboxylic acid pellet according to the invention.

Explanation for References
1 . . . feed hopper
2 . . . horizontal continuous heating vessel
3 . . . horizontal continuous heating vessel
4 . . . solid phase polycondensation reaction vessel
5 . . . nitrogen cleaning device
6 . . . blower
7 . . . heater

BEST MODE FOR PRACTICING THE INVENTION

A process for preparing a polyhydroxycarboxylic acid of high molecular weight according to this invention is to be explained more specifically.

The invention has a feature in a process for preparing a polyhydroxycarboxylic acid of high molecular weight comprising a crystallizing step of heating to crystallize pellets of the polyhydroxycarboxylic acid of low molecular weight obtained by a liquid polycondensation reaction step and a solid phase polycondensation reaction step of heating the same to a temperature not lower than the crystallizing temperature, in which the crystallizing step and the solid phase polycondensation reaction step are conducted under specified conditions.

Liquid Phase Polycondensation Reaction Step

The polyhydroxycarboxylic acid of low molecular weight used for the crystallizing and solid phase polycondensation reaction steps is obtained, for example, by way of the following liquid phase polycondensation reaction step.

The liquid phase polycondensation reaction step is a step of preparing a polyhydroxycarboxylic acid of low molecular weight by dehydrating polycondensation reaction of a hydroxy-carboxylic acid as a monomer in a liquid state, that is, in a solution state or a molten state.

There is no particular restriction for the hydroxycarboxylic acid used in the invention providing that it is a carboxylic acid having a hydroxyl group.

Specifically, there can be mentioned aliphatic hydroxycarboxylic acids such as 2-hydroxyetanoic acid, 2-hydroxypropanoic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2- pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-buthylheptanoic acid, 3-hydroxy-3-methyloctanoic acid, 3-hydroxy-3-ethyloctanoic acid, 3-hydroxy-3-propyloctanoic acid, 3-hydroxy-3-butyloctacnoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4-hydroxy-4-methylhexanoic acid, 4-hydroxy-4-ethylhexanoic acid, 4-hydroxy-4-metylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydorxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid and 8-hydroxyoctanoic acid as well as oligomers or cyclic dimers such as glycolides and lactides derived therefrom.

Further, the cyclic dimers of the glycolides and the lactides can include specifically, for example, cyclic ester intermediate products of hydroxy-carboxylic acids, for example, lactide as a cyclic dimer of lactic acid, glycolide as a cyclic dimer of glycolic acid, ε-caprolactone as a cyclic ester of 6-hydroxycapronic acid, as well as β-propiolactone, γ-butylolactone and δ-valerolactone.

Among them, preferred specific examples can include, for example, lactic acid, glycolic acid, 3-hydroxybutyric acid, 4-hydroxybutyric acid, 4-hydroxyvaleric acid, 5-hydroxyvaleric acid, and 6-hydroxycapronic acid. Lactic acid is particularly preferred in view of the transparency of the obtained polyhydroxycarboxylic acid. These hydroxycarboxylic acids may be used in a combination of two or more of them.

In a case where asymmetric carbon is present in the molecule as in lactic acid, D form, L form and equimolar mixture (racemic form) thereof are present and any one of them can be used providing that the resultant polyester polymer has crystallinity. Among them, L-lactic acid is particularly preferred.

In the invention, the polyhydroxycarboxylic acid is prepared using the hydroxy-carboxylic acid as the starting material, and 20 mol % or less of di-carboxylic acid and/or glycol may also be used.

There is no particular restriction for the dicarboxylic acids used in the invention and they include, for example, aliphatic di-carboxylic acid such as succinic acid, oxalic acid, maronic acid, glutaric acid, adipic acid, pimelic acid, suberic acid, azelaic acid, sebacinic acid, undecane diacid, dodecane diacid, and 3,3-dimethylpentane diacid, cycloaliphatic dicarboxylic acid such as cyclohexane dicarboxylic acid, and aromatic di-carboxylic acid such as terephthalic acid, isophthalic acid, phthalic acid, diphenyl dicarboxylic acid, diphenoxy ethanedicarboxylic acid and 2,6-naphthalene dicarboxylic acid.

Such dicarboxylic acids may be used alone or as a combination of two or more of them. Further, in a case where an asymmetric carbon is present in the molecule, D-form, L-form and an equimolar mixture (racemic form) thereof are present and any one of them can be used.

There is no particular restriction for glycols used in the invention and they include, for example, ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentylglycol, polytetramethylene glycol, 1,4-hexanediol and 1,4-cyclohexanedimethanol.

The glycols may be used alone or as a combination of two or more of them. Further, in a case where an asymmetric carbon is present in the molecule, D-form, L-form and an equimolar mixture (racemic form) thereof are present and any one of them can be used.

Further, in the invention, the polyhydroxycarboxylic acid is prepared by using the hydroxy-carboxylic acid as the starting material and the starting hydroxy-carboxylic acid can be incorporated with other compounds, for example, monofunctional compounds such as benzoyl benzoic acid, diphenyl sulfone monocarboxylic acid, stearic acid, methoxypolyethylene glycol and phenoxypolyethylene glycol, and polyfunctional compounds such as trimesic acid, trimethylol ethane, trimethylol propane and pentaerythritol.

Such other compounds can be added to the hydroxy-carboxylic acid in an amount of 0.01 mol % to 20 mol %, preferably, 0.05 mol % to 10 mol %.

There is no particular restriction for the catalyst used in the liquid phase polycondensation reaction so long as it substantially promotes the progress of the dehydrating polycondensation reaction.

Specific examples of the catalyst can include, for example, metals, belonging to the groups II, III, IV and V of the periodical table, and oxides and salts thereof.

More specifically, there can be mentioned metals such as zinc powder, tin powder, aluminum, magnesium and germanium, metal oxides such as tin oxide (II), antimony oxide (III), zinc oxide, aluminum oxide, magnesium oxide, titanium oxide (IV) and germanium oxide (IV), metal halides such as tin chloride (II), tin chloride (IV), tin bromide (II), tin bromide (IV), antimony fluoride (III), antimony fluoride (V), zinc oxide, magnesium chloride and aluminum chloride, sulfates such as tin sulfate (II), zinc sulfate and aluminum sulfate, carbonates such as magnesium carbonate and zinc carbonate, borates such as zinc borates, organic carboxylates such as tin acetate (II), tin octanoate (II), tin lactate (II), zinc acetate and aluminum acetate, organic sulfonates such as tin trifluoromethane sulfonate (II), zinc trifluoromethane sulfonate, magnesium trifluoromethane sulfonate, tin (II) methane sulfonate and tin (II) p-toluene sulfonate, and organic sulfonic acids such as methane sulfonic acid, ethane sulfonic acid, 1-propane sulfonic acid, 1-butane sulfonic acid, trifluoromethane sulfonic acid, benzene sulfonic acid, p-toluene sulfonic acid, p-xylene-2-sulfonic acid, naphthalene-1-sulfonic acid and naphthalene 2-sulfonic acid, and acids such as hydrochloric acid and sulfuric acid.

Other examples can include, for example, metal alkoxides of the metals described above such as dibutyl tin oxide, or alkyl metals of the metals described above such as diethyl zinc. Among them, tin powder (metal powder), tin oxide (II), p-toluene sulfonic acid and methane sulfonic acid are particularly preferred.

They can be used alone or as a combination of two or more of them.

There is no restriction for the amount of the catalyst used providing that it substantially promotes the reaction rate.

The amount of the catalyst used varies depending on the kind of the catalyst used and, generally, it is preferably within a range from 0.00005 to 5% by weight of the polyhydroxycarboxylic acid of low molecular weight to be obtained and it is preferred within a range from 0.0001 to 2% by weight in view of the economical performance.

There is no particular restriction for the method of conducting dehydrating polycondensation reaction in the liquid phase polycondensation reaction step and it is generally preferred to conduct the dehydrating polycondensation reaction in an inert gas atmosphere, a flowing gas atmosphere and/or under a reduced pressure, and the reaction method for the dehydrating polycondensation reaction adopts a melt polymerization reaction system or a solution polymerization reaction system using an organic solvent.

Further, the dehydrating polycondensation reaction can be conducted by properly selecting the conditions such as use of the organic solvent in accordance with the desired weight average molecular weight (Mw) and the convenience and the simplicity of the operation (solution polymerization reaction system).

Generally, in a case of using the organic solvent (solution polycondensation reaction system), a prepolymer having a weight average molecular weight (Mw) of 15,000 or more can be obtained efficiently. The method of not using the organic solvent (melt-polycondensation reaction system) has a feature that the operation is simple and convenient since the labor of distilling off the organic solvent can be saved in the prepolymer solidifying step.

There is no particular restriction for the organic solvent in a case of using the organic solvent in the liquid phase polycondensation reaction step providing that the solvent can substantially maintain the progress of the dehydrating polycondensation reaction and they may be used alone or as a combination of two or more of them.

Specific examples of such organic solvent can include, for example, hydrocarbon solvents such as toluene, xylene and mesitylene, halogen type solvents such as chlorobenzene, bromobenzene, iodobenzene, p-dichlorobenzene, 1,1,2,2-tetrachloroethane and p-chlorotoluene, ketone type solvents such as 3-hexanone, acetophenone and benzophenone, ether solvents such as dibutyl ether, anisol, phenetol, o-dimethoxybenzene, p-dimethoxybenzene, 3-methoxytoluene, dibenzyl ether, benzylphenyl ether and methoxynaphthalene, thioether solvents such as phenylsulfide and thioanisol, ester solvents such as methyl benzoate, methyl phthalate and ethyl phthalate, diphenyl ether solvents, for example, alkyl-substituted diphenyl ethers such as diphenyl ether, 4-methylphenyl ether, 3-methylphenyl ether and 3-phenoxytoluene, or halogen-substituted diphenyl ether such as 4-bromophenyl ether, 4-chlorophenyl ether, 4-bromodiphenyl ether and 4-methyl-4'-bromophenyl ether, or alkoxy-substituted diphenyl ether such as 4-methoxydiphenyl ether, 4-methoxyphenyl ether, 3-methoxyphenyl ether and 4-methyl-4'-methoxydiphenyl ether, or cyclic diphenyl ether such as dibenzofuran and xanthene, among them, hydrocarbon solvents, halogen solvent and alkyl-substituted diphenyl ether solvents being particularly preferred. Among them, toluene, xylene, o-dichlorobenzene and diphenyl ether are particularly preferred.

The boiling point of the solvent usable in the liquid phase polycondensation reaction step is preferably 100° C. or higher, more preferably, 135° C. or higher and, further preferably, 70° C. or higher.

When the organic solvent is used in the liquid phase polycondensation reaction step, there is no particular restriction for the reaction temperature so long as the liquid state of the organic solvent in the reaction system can be maintained substantially and the progress of the dehydrating polycondensation reaction can be maintained in view of the forming rate and the thermal decomposition of the polyester.

The reaction temperature in the liquid phase polycondensation reaction step is preferably within a range from 100° C. to 200° C. and, more preferably, within a range from 110° C. to 180° C.

When the reaction is conducted under a normal pressure (atmospheric pressure) by using the organic solvent in the liquid phase polycondensation reaction step, the distilling temperature of the organic solvent at the normal pressure (atmospheric pressure) is usually adopted as the reaction temperature.

When the organic solvent is used and the reaction is conducted under a specified pressure in the liquid phase polycondensation reaction step, the distilling temperature under pressure in the reaction system of the organic solvent is usually adopted as the reaction temperature.

Further, when an organic solvent having a boiling point under the normal pressure (atmospheric pressure) at a temperature higher than a preferred reaction temperature, the pressure in the reaction system may be lowered in order conduct the reaction at a preferred reaction temperature.

In the liquid phase polycondensation reaction step, the dehydrating polycondensation reaction can be proceeded efficiently with no undesired side reactions by conducting the dehydrating polycondensation reaction at a low temperature and under high vacuum.

There is no particular restriction for the amount of the organic solvent used in the liquid phase polycondensation reaction step providing that the progress of the reaction can be maintained substantially.

The amount of the organic solvent used in the liquid phase polycondensation reaction step is set generally while considering the reaction rate, the purity of the reaction products (polyhydroxycarboxylic acid), volumic efficiency or recovery of solvent with an industrial point of view. Usually, being converted as the concentration of the polyhydroxycarboxylic acid to be obtained, it is 10% or more and, preferably, 50% by weight or more and, further preferably, 80% by weight or more.

There is no particular restriction for the reaction temperature when the organic solvent is not used in the liquid phase polycondensation reaction step, providing that the progress of the dehydrating polycondensation reaction can be maintained. Specifically, the reaction is conducted at the temperature not lower than the melting point of the polymer present in the reaction system while considering the forming rate and the thermal decomposition rate of the polyhydroxycarboxylic acid. It is preferred to conduct reaction within a temperature range of melting point or higher to 250° C. or lower. Among them, the range form 100° C. to 200° C is preferred and a range of 110° C. to 180° C. is further preferred.

The liquid phase polycondensation reaction system can be conducted either by continuous or batch type polymerization system.

There is no particular restriction for the method of recovering the polyhydroxycarboxylic acid from the reactor after the completion of the liquid phase polycondensation reaction. For example, when the liquid phase polycondensation reaction is conducted in a molten state, the polyhydroxycarboxylic acid is recovered after the completion of the reaction in the form of strands. Further, when the liquid phase polycondensation reaction is conducted in a solution state, a poor solvent to the polyhydroxycarboxylic acid is added to the reaction solution or the reaction solution is discharged into a poor solvent, by which the polyhydroxycarboxylic acid can be separated as crystals.

The weight average molecular weight (Mw) of the polyhydroxy-dicarboxylic acid polymer of low molecular weight thus obtained in the liquid phase polycondensation reaction step is preferably from 2,000 to 100,000, and, further preferably, from 5,000 to 30,000.

The weight average molecular weight (Mw) of the polyhydroxycarboxylic acid is determined with reference to a polystyrene standard sample by a gel permeation chromatography (GPC, column temperature: 40° C., chloroform solvent).

In this case, the exothermic peak area corresponding to the heat of crystallization observed upon temperature elevation analysis of the polyhydroxycarboxylic acid obtained from the liquid phase polycondensation reactor by using a differential scanning calorimeter is 30 J/g or more.

The thus obtained polyhydroxycarboxylic acid of low molecular weight is usually molded into pellets and supplied to the subsequent crystallizing step.

Pelleting Step

However, since the polyhydroxycarboxylic acid of low molecular weight has low melting viscosity, it is difficult to obtain particles of uniform shape by a strand cut, underwater cut or hot cut method used in pelleting of usual polymers and no satisfactory pellets are formed but they tend to be in a finely powdery form such as a powder or a flake. Such finely powdery form is not only difficult to handle with but also cause blocking of the polyhydroxycarboxylic acid when used in the subsequent crystallizing step and the solid phase polycondensation reaction step and the crystallizing step and the solid phase polycondensation reaction step can not be conducted efficiently, so that they are preferably pelleted by way of the following step.

Pellets usable for the preparation of the polyhydroxycarboxylic acid of high molecular weight by crystallization and solid phase polycondensation reaction of the invention can be obtained in the particulate state, for example, by melting, dropping and cooling to solidify the polyhydroxycarboxylic acid of low molecular weight prepared by the method described above.

The polyhydroxycarboxylic acid of low molecular weight is dropped after being formed in a liquid (molten) state, and the method of cooling to solidify the droplets is conducted, concretely, by cooling the droplets in contact with a cooled plate, drum or belt.

The temperature of the droplets may be a temperature not lower than the melting point of the polyhydroxycarboxylic acid and when the polyhydroxycarboxylic acid is polylactic acid, it is preferably from 140° C. to 200° C. and, particularly, preferably from 150° C. to 190° C. If it is lower than the temperature described above, the polylactic acid is solidified, whereas it is higher than the temperature described above, it tends to lower the molecular weight and cause pigmentation by thermal decomposition, which is not so preferred.

The melting viscosity of the low molecular weight polyhydroxycarboxylic acid is preferably from 0.01 poise to 100 poise, more preferably, from 0.1 poise to 50 poise and, particularly preferably, from 0.5 poise to 30 poise.

Further, the particle diameter of the thus obtained particulate low molecular weight polyhydroxycarboxylic acid is preferably from 0.1 mm to 20 mm, more preferably, from 0.5 mm to 15 mm and, particularly preferably, from 1 mm to 10 mm. If the diameter of the particles is less than the particle diameter described above, it tends to form fine powder, whereas if it is larger particle diameter, the particle is sometimes difficult to handle with in the subsequent handling, which is not so preferred.

The standard deviation of the particle size is preferably within 1 mm and, particularly preferably, within 0.7 mm. If the standard deviation is larger, that is, the particle size distribution is broader, it is not preferred since the flowability of the particles in the solid phase polycondensation reaction, molecular weight distribution between each of the particles and the stability of supply to the molding machine tends to become poor.

The temperature of the plate, drum or belt used for cooling is preferably not higher than the glass transition temperature of the low molecular weight polyhydroxycarboxylic acid and in a case where the low molecular weight polyhydroxycarboxylic acid is polylactic acid, it is preferably 70° C. or lower.

Further, the temperature of the low molecular weight polyhydroxycarboxylic acid to be cooled and recovered after dropping is desirably not higher than the glass transition point.

The droplet pelleting machine for preparing particulate polyhydroxycarboxylic acid by melting, dropping and cooling to solidify the low molecular weight polyhydroxycarboxylic acid of the invention can include, specifically, ROTOFORMER, manufactured by SANDVIK Co., rotary type drop former and piston type drop former, manufactured by Kaiser Co. and hybrid former manufactured by Nippon Belding Co.

Further, pellets obtained by the following methods are also preferably used in the subsequent crystallizing step and solid phase polycondensation reaction step.

The pellet comprises a inner core portion (I) and an outer coating portion (II) covering the inner core portion which is illustrated, for example, in FIG. 1. FIG. 1 shows a schematic perspective view as one example of a polyhydroxycarboxylic acid pellet according to this invention. In FIG. 1, reference 1 denotes an inner core portion and reference 2 denotes an outer coating portion. The outer coating portion is sometimes referred to as a sheath.

The shape of the pellet is optional and it is preferably columnar or square post shape as shown in FIG. 1.

The axial length of the pellet is usually within a range from 0.5 mm to 5.0 mm, preferably, from 1.5 mm to 4.5 mm.

Further, the diameter of the polyhydroxycarboxylic acid pellet is desirably within a range usually from 0.5 mm to 5.0 mm and, preferably, from 1.5 mm to 4.5 mm.

The weight ratio between the outer coating portion and the inner core portion is optional and the weight of the inner core portion is within a range from 40 to 98% by weight and, preferably from 50 to 95% by weight.

In the polyhydroxycarboxylic acid pellet according to the invention, the outer coating portion comprises a resin containing a polyhydroxycarboxylic acid having a weight average molecular weight (Mw) of 30,000 to 200,000, preferably, from 30,000 to 100,000 resin.

The resin containing the polyhydroxycarboxylic acid constituting the outer coating portion comprises a resin containing 50 to 100% by weight, preferably, 65 to 100% by weight of polyhydroxycarboxylic acid.

The resin constituting the outer coating portion of the polyhydroxycarboxylic acid pellet of the invention is preferably comprises only the polyhydroxycarboxylic acid but it may be a resin composition of polyhydroxycarboxylic acid and a resin other than polyhydroxycarboxylic acid.

The blending amount of the resin other than the polyhydroxycarboxylic acid is from 0 to 50% by weight, preferably, 0 to 35% by weight based on the resin constituting the outer coating portion.

The resin other than the polyhydroxycarboxylic acid described above can include polyethylene terephthalate, polyester containing comonomers such as 20 mol % or more of isophthalic acid and cyclohexane dimethanol, polyester containing 20 mol % or more of isophthalic acid and 1 mol % or more of 1,3-bis(hydroxyethoxy)benzene, polyester-polyester block copolymer containing an aliphatic carboxylic acid such as adipic acid or sebacic acid as a comonomer, polyester-polyether block copolymer having polyether such as polybutylene glycol as a soft segment and polyesters such as polybutylene terephthalate and polyethylene naphthalate.

Further, as the resin other than polyhydroxycarboxylic acid, polyolefins containing constituent units derived from olefin monomers of 2 to 6 carbon atoms can also be used. Such polyolefins can include low density polyethylene, high density polyethylene, linear low density polyethylene, polypropylene, polybutene, polypentene and polymethylpentene.

When the polyolefin resin is used as the resin other than polyhydroxycarboxylic acid, the blending amount of the resin is from 0 to 10% by weight, preferably, from 0 to 5% by weight based on the resin constituting the outer coating portion.

Further, as the resin other than polyhydroxycarboxylic acid, ethylene (meth) acrylic acid copolymer may also be used. The ethylene-(meth)acrylic acid copolymer can include, for example, ethylene-methacrylic acid copolymer, ethylene-acrylic acid copolymer and ethylene-acrylic acid-methacrylic acid terpolymer. The ethylene(meth)acrylic acid copolymer may also contain other ingredient than ethylene and (meth)acrylic acid copolymerized by a small amount and the ingredient other than ethylene and (meth)acrylic acid can include unsaturated carboxylic acid esters such as methyl(meth)acrylate, ethyl(meth)acrylate and isobutyl (meth)acrylate and vinyl esters such as vinyl acetate.

When ethylene(meth)acrylic acid copolymer is used as the resin other than polyhydroxycarboxylic acid, the blending amount of the resin is from 0 to 10% by weight and, preferably, from 0 to 5% by weight based on the resin constituting the outer coating portion.

The (meth)acrylic acid content in the ethylene-methacrylic acid copolymer is preferably from 0.5 to 8% by weight and, particularly, from 1 to 6% by weight. When the (meth) acrylic acid content is within the range described above, the crystallizing rate upon temperature elevation can be improved while maintaining the transparency of the polyhydroxycarboxylic acid resin composition obtained by blending with the polyhydroxycarboxylic acid. The ethylene (meth) acrylic acid copolymer has MFR (190° C.) according to ASTM D 1238 of usually from 0.05 to 100 g/10 min. and, preferably, 0.1 to 50 g/10 min. The ethylene(meth)acrylic acid copolymer may include those in which carboxyl groups present on the side chain are not bonded with metals and, in addition, those at least a portion thereof is present in the form of metal carboxylate (ionomer). The metal salt is preferably an alkali metal salt such as sodium salt, lithium salt or potassium salt, a bivalent transition metal salt such as zinc salt, cobalt salt, nickel salt, manganese salt, and copper salt, and an alkaline earth metal salt such as calcium salt and magnesium salt. Particularly, zinc salt is desirable since it can maintain the transparency of the polyhydroxycarboxylic acid resin composition. When the ethylene(meth)acrylic acid copolymer is an ionomer, there is no particular restriction for the ratio of carboxyl groups bonded with the metals relative to the entire carboxyl groups, and it is within a range usually from 3% to 100%. Such ethylene-(meth)acrylic acid copolymer is prepared, for example, by a method of copolymerizing ethylene and (meth) acrylic acid and, optionally, other comonomer by a high pressure radical polymerizing method and then optionally neutralizing with ions of the metal described above.

Furthermore, the resin other than the polyhydroxycarboxylic acid described above can include, for example, polyamides such as nylon 6, nylon 6,6 and nylon 12, and polycarbonates such as polyester carbonates and polycarbonates.

When the polyamides or polycarbonates are used as the resin other than polyhydroxycarboxylic acid, the blending amount of the resin is from 0 to 10% by weight, preferably, from 0 to 5% by weight based on the resin constituting the outer coating portion.

Among them, polyesters containing comonomers such as 20 mol % or more of isophthalic acid and cyclohexane dimethanol, polyesters containing 1 mol % or more of 1,3-bis(hydroxyethoxy)benzene, polyolefins and ethylene-(meth)acrylic acid copolymers are preferred.

The resin constituting the outer coating portion may contain usual additives, for example, colorant, antioxidant, oxygen absorber, UV-ray absorber, antistatic agent, flame retardant, bluing agent, (external) lubricant and heat stabilizer.

In the polyhydroxycarboxylic acid pellet according to the invention, the inner core portion comprises a resin containing polyhydroxycarboxylic acid having the weight average molecular weight (Mw) within a range from 2,000 to 30,000.

The resin containing polyhydroxycarboxylic acid constituting the inner core portion comprises a resin containing 50 to 100% by weight, preferably, 65 to 100% by weight or polyhydroxycarboxylic acid.

The resin constituting the inner core portion has a melting point lower than that of the resin constituting the outer coating portion or shows no melting point. When the resin shows the melting point, the difference of the melting point between the resin constituting the inner core portion and the resin constituting the outer coating portion is preferably within a range from 5° C. to 40° C., particularly, 8° C. to 30° C.

Further, the polyhydroxycarboxylic acid constituting the inner core portion is prepared by the same method as for the polyhydroxycarboxylic acid in the outer coating portion and it is preferably only by the liquid phase polycondensation reaction step. Further, other resins exemplified for the resin constituting the outer coating portion may be blended by 50% by weight or less, preferably, 35% by weight based on the entire resin that constitutes the inner core portion within a range not deteriorating the purpose of the invention.

The polyhydroxycarboxylic acid pellet having the outer coating portion and the inner core portion of the invention can be prepared by a method of melt kneading the resin constituting the outer coating portion and the resin constituting the inner core portion respectively by separate extruders, then joining them in a dice and extruding them and by cooling in a customary method, for example, cutting in air and dropping into water, or a method of introducing the molten resin into water and then palletizing the same. A pelleting method used customarily by the underwater cut and strand cut can of course be adopted.

The extruder may be a single screw extruder or a twin screw extruder, or a vacuum vent line may be disposed optionally in the midway of the extruder.

The polyhydroxycarboxylic acid resin used for the outer coating portion and the polyhydroxycarboxylic acid resin used for the inner core portion may or may riot be dried previously before charging into the extruder.

The thus obtained pellet is usually in a columnar or square post shape. The cross sectional shape is optional and can be formed into a desired shape by selecting an appropriate dice.

Further, the pellet can be deformed or the cut face shape may be deformed upon cutting in accordance with the cooling condition for the strand, the shape of the cutter blade, the take-up speed and the number of rotation of the cutter blade.

Further, the pellet height and the pellet diameter can be changed optionally by the change for the cutting conditions such as the form of the cutting blade, the take-up rate and the number of rotation of the cutter blade.

The thus obtained pellet is used suitably to the flowing crystallizing step and the solid phase polycondensation reaction step.

Crystallizing Step

The crystallizing step is a step of heating the pellet of the polyhydroxycarboxylic acid obtained in the step described above to a temperature lower than the temperature for conducting the solid phase polycondensation reaction to be described later. This step intends to increase the crystallinity of the polyhydroxycarboxylic acid so that the blocking or fusion of polyhydroxycarboxylic acid pellets of low molecular weight take place upon conducting the solid phase polycondensation reaction. In this case, there are various methods for recognizing that an aimed crystallization is obtained. In the invention, areas for the endothermic peak and exothermic peak by differential scanning calorimetry to be described later is used. That is, the degree of crystallinity of the polyhydroxycarboxylic acid is hither as the endothermic peak area is smaller and the exothermic peak area is larger.

This step comprises a step (A) and a step (B) to be described below specifically.

Specifically, a step (A) of heating the pellet of the polyhydroxycarboxylic acid of low molecular weight at first to a temperature not lower than the glass transition point (glass transition temperature) and not higher than the melting point, preferably, within a range of temperature from (glass transition point +20)° C. to (melting point −20)° C. to crystallize the same till the exothermic peak area corresponding to the heat of crystallization is 10 J/g or less and the endothermic peak area corresponding to the melting heat is 38 J/g or more is conducted, recognized upon temperature elevation analysis of the polyhydroxycarboxylic acid by using a differential scanning calorimeter.

More specifically, when the polyhydroxycarboxylic acid of low molecular weight is a low molecular weight polylactic acid, the heating temperature is preferably from 55° C. to 130° C. and, further preferably, 65° C. to 110° C.

When the pellet of the low molecular weight polyhydroxycarboxylic acid is put to temperature elevation analysis by using the differential scanning calorimeter, an exothermic peak corresponding to the heat of crystallization is observed on the side of lower temperature and then an endothermic peak corresponding to the heat of melting is observed on the side of higher temperature. In this invention, the end point of the crystallizing step is determined in accordance with the area for the exothermic peak and the area for the endothermic peak in this analysis.

Then, the exothermic peak and the endothermic peak by the differential scanning calorimeter are measured as below. That is, using Pyris1 type differential scanning calorimeter manufactured by Perkin Elmer Co., a slice of 5 mg of specimen taken from a central portion of a pellet of the polyhydroxycarboxylic acid dried at 60° C. under a pressure of 5 mmHg for about 5 hours or more is sealed in a nitrogen atmosphere in an aluminum liquid pan and measured. The areas for the exothermic peak and the endothermic peak are detected upon temperature elevation at a rate of 10° C. from 20° C. as the measuring condition. Then, it is converted based on the weight of the specimen into the heat calorie per unit weight (melting heat calorie per 1 g(unit: joule)).

Figure 2:
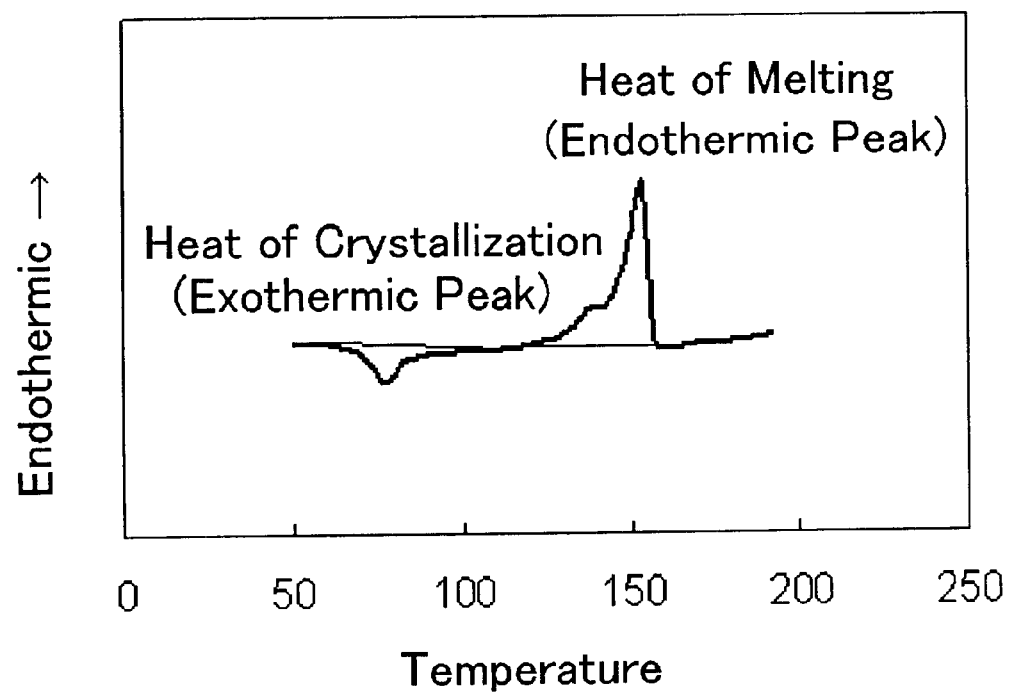
FIG. 2 shows an example for the result of measurement for a polyhydroxycarboxylic acid measured by a differential scanning calorimeter.

FIG. 2 shows an example of a differential scanning thermal curve for the polyhydroxycarboxylic acid measured by the differential scanning calorimeter.

For the apparatus used actually in the step (A), a vertical or horizontal stirring device with a stirring blade can be adopted for instance. The stirring device is preferably of such a continuous type that pellets of polyhydroxycarboxylic acid are supplied on one side and discharged from the other side.

The step (A) is conducted by using, for example, the stirring device as described above and supplying pellets of polyhydroxycarboxylic acid from one side of the device, heating the pellets of polyhydroxycarboxylic acid while stirring them under flow of a heating gas and then discharging them form the other side.

Further, step (A) is desirably conducted within an inert gas atmosphere or liquid. The inert gas used in this case can include, for example, nitrogen gas, helium gas, argon gas, xenon gas, krypton gas and gaseous carbon dioxide.

The residence time (heating time) of the polyhydroxycarboxylic acid in the step (A) is from 1 min. to 180 min. and, preferably, from 3 min. to 60 min.

Then, a step (B) of elevating the temperature of the pellets of polyhydroxycarboxylic acid under stirring from the temperature described above to the temperature for solid phase polycondensation reaction is conducted.

More specifically, the heating temperature in the step (B) is preferably at a temperature within a range from the temperature for the solid phase polycondensation reaction step to (temperature for solid phase polycondensation reaction step −40° C.)

Further, when the polyhydroxycarboxylic acid is polylactic acid, the range from 100° C. to 150° C. is preferred and from 120° C. to 140° C. is further preferred.

In this step (B), the same device as the stirring device used in the step (A) can be adopted. Also the stirring device is preferably of a continuous type in which pellets of polyhydroxycarboxylic acid from one side is supplied and then discharged from the other of them.

Further, the step (B) is preferably conducted in the same inert gas atmosphere as that in the step (A). Further, the inert gas used is identical with that for the step (A).

The residence time (heating time) of the polyhydroxycarboxylic acid in the step (B) is from 1 min. to 180 min., preferably, 3 min. to 60 min.

By the crystallization and preheating steps comprising the step (A) and the step (B), the polyhydroxycarboxylic acid is crystallized such that the endothermic peak area is 5 J/g or less, preferably, 3 J/g or less and the exothermic peak area is 38 J/g or more, preferably, 42 J/g or more.

As described above, pellets of the polyhydroxycarboxylic acid crystallized and preheated in this step are supplied to the next solid phase polycondensation reaction step.

Solid Phase Polycondensation Reaction Step

The solid phase polycondensation reaction step in the invention comprises at least one stage.

The reaction temperature for the solid phase polycondensation reaction step is at or lower than the endothermic start temperature of the endothermic peak recognized upon temperature elevation analysis for the pellets of the polyhydroxycarboxylic acid crystallized and preheated in the steps (A) and (B) by using the differential scanning calorimeter.

More specifically, when the polyhydroxycarboxylic acid is polylactic acid, the polycondensation temperature is preferably from 100° C. to 165° C. and, more preferably, from 115° C. to 160° C.

As the solid phase polycondensation reaction step proceeds, the endothermic start temperature of the endothermic peak shifts toward the higher temperature region. The step may be in a multi-stage such that the temperature for solid phase polycondensation reaction is lower than the endothermic start temperature as the endothermic start temperate of the endothermic peak shifts.

The solid phase polycondensation reaction step is conducted under a pressure of the condition usually of 1 $kg/cm^2$-G to 10 Torr, preferably from ambient pressure to 10 Torr.

The solid phase polycondensation reaction step is usually conducted in an inert gas atmosphere such as of nitrogen gas, helium gas, argon gas, xenon gas, krypton gas and gaseous carbon dioxide. The solid phase polycondensation reaction may be conducted also at a high temperature and under a reduced pressure.

The water content in the gases used in the solid phase polycondensation reaction step is preferably as low as possible and, substantially, in an anhydrous state. If the water content is higher, since water formed by the dehydrating polycondensation reaction can not be removed efficiently, to sometimes reduce the polymerization rate, and it is not preferred. In such a case, the gas is used after dehydration by passing through a layer filled with molecular sieves or ion exchange resins.

Referring to the water content in the gas in view of the dew point, the dew point of the gas is preferably −20° C. or lower and, more preferably, −50° C. or lower.

There is no particular restriction on the flow rate of the gas used in the solid phase polycondensation reaction step so long as the water formed can be removed to such an extent that a polyhydroxycarboxylic acid having a sufficiently high weight average molecular weight can be obtained in the dehydrating polycondensation reaction in view of the polymerization rate, the kind and the amount of the catalyst used, and the weight average molecular weight of polyhydroxycarboxylic acid in the dehydrating polycondensation reaction to the polyhydroxycarboxylic acid.

The weight average molecular weight of the polyhydroxycarboxylic acid obtained by way of the solid phase polycondensation reaction step (Mw) is preferably within a range of 50,000 to 1000,000 and, further preferably, from 100,000 to 500,000.

The solid phase polycondensation reaction step may be conducted either by continuous or batch type polymerization system.

The catalyst may or may not be used for the solid phase polycondensation reaction step. When the catalyst is used, the catalyst usable in the liquid phase polycondensation reaction system can be used in an amount used for the liquid phase polycondensation reaction step. Further, the amount can be added while considering the amount of the catalyst carried from the liquid phase polycondensation reaction step.

Application Use of Polyhydroxycarboxylic Acid

The polyhydroxycarboxylic acid of high molecular weight prepared in the invention can be used suitably as substitutes for those resins used generally for medical application uses and food packaging application uses which had been publicly known and used prior to the filing of the application.

There is no particular restriction for the molding methods of the polyhydroxycarboxylic acid of high molecular weight according to the invention and they can include, specifically, injection molding, extrusion molding, inflation molding, extrusion expansion molding, foam molding, calendar molding, blow molding, balloon molding, vacuum forming and spinning. Among them, inflation molding, blow molding, extrusion expansion molding, foam molding and spinning being further preferred.

The polyhydroxycarboxylic acid can be used suitably by appropriate molding process, for example, also to materials for writing tools such as ball point pen and mechanical pencils, stationary materials, golf tees, materials for smoking golf ball for use in first ball throwing ceremony, capsules for oral pharmaceuticals, suppositories for anus and vagina, carriers for skin and mucous membrane plasters, capsules for use in agricultural chemicals, capsules for fertilizers, capsules for seeds and seedlings, compost bags, fishing reels, fishing buoys, fishing lures, lures, fishing buoys, hunting decoys, capsules for hunting shots, camp goods such as tablewares, pegs, spikes, binders, antislipping materials for muddy and snowy roads and blocks.

Further, they can be used suitably by appropriate molding methods, for example, also to lunch boxes, tablewares, containers for lunches and daily dishes sold in convenience stores, chopsticks, half-split chopsticks, forks, spoons, skewers, toothpicks, cups for instant noodles, cups such as used in automatic vending machines, containers and trays for foods such as fishes, meats, vegetables and fruits, soybean curds, and daily dishes, carrier boxes such as used in fish markets, bottles for dairy products such as yogurts and lactic acid beverages, bottles for soft drinks such as carbonate drinks and soft drinks, bottles for alcoholic drinks such as beer and whisky, bottles with or without pumps for shampoos and soaps, dentifrice tubes, cosmetic containers, detergent containers, bleach containers, cold keeping boxes, planters, casings for water purifier cartridges, casings for artificial kidneys or levers, materials for injection cylinders, buffer materials for use upon transportation of domestic electronic products such as television or stereo sets, buffer materials for use upon transportation of precision machines such as computers, printers and watches, and buffer materials for use upon transportation of pottery products such as glass or ceramics.

Further, the films or the sheets including the polyhydroxycarboxylic acid of high molecular weight according to the invention can be used suitably also as shopping bags, garbage bags, compost bags, cement bags, fertilizer bags, sand bags, packaging films for food stuffs and candies, food wrapping films, films for agricultural or horticultural uses, green house films, packaging films for magnetic tape cassette products for video or audio equipments, packaging films for floppy disks, fences, oil fences for sea, river and lake uses, adhesive tapes, tapes, binders, water proof sheets, umbrellas and tents.

Further, foamed products containing the polyhydroxycarboxylic acid of high molecular weight according to the invention can also be used suitably, for example, also to lunch boxes, tablewares, containers for lunches and daily dishes sold in convenience stores, cups for instant noodles, cups such as used in automatic vending machines, containers and trays for foods such as fishes, meats, vegetables and fruits, soybean curds, fermented soybeans and daily dishes, carrier boxes such as used in fish markets, containers for dairy products such as milk, yogurts and lactic acid beverages, bottles for soft drinks such as carbonate drinks and soft drinks, bottles for alcoholic drinks such as beer and whisky, cosmetic containers, detergent containers, bleach containers, cold keeping boxes, planters, buffer materials for use upon transportation of domestic electronic products such as television or stereo sets, buffer materials for use upon transportation of precision machines such as computers, printers and watches, buffer materials used for transportation of optical equipments such as cameras, spectacles, microscopes and telecopier, buffer materials used for transportation of pottery products such as glass and ceramics, light shielding materials, heat insulators and sound proof materials.

Further, the foamed products including the polyhydroxycarboxylic acid of high molecular weight according to the invention can be used suitably also to medical or hygiene uses. For example, they can be used suitably as bandages, plaster supports for skin and mucous membrane uses, triangle bandages, plaster patches, towels, disposable towels, disposable wet towels, wet hand towels, mops, tissues, sanitary wet tissues for cleaning and sterilization, wet tissues for cleaning infants' hips, disposable diapers, napkins for sanitary and secretion uses, sanitary tampons, blood absorbing tampons for surgical and maternity uses, sanitary cover stock materials and sterilizing bags.

Further, they can be used suitably for general industrial uses including agriculture, fishery, forestry, industry, civil engineering and traffic, as well as recreation uses including leisure and sport uses. For example, they can be used suitably as agricultural cheesecloth, oil absorbing materials, soft/weak ground reinforcing materials, artificial leathers, substrate for floppy disks, cement bags, fertilizer bags, sand bags, heat insulators, sound proof materials, cushioning materials, cushioning materials for furnitures, such as beds and chairs, floor cushioning materials, packaging materials, binder materials and antislipping materials for muddy and snowy roads.

EXAMPLE

The invention is to be described more specifically with reference to examples.

Synthesis examples, preferred embodiments and examples described in the specification of the present application are for the aid of understanding the contents of the invention and the technical scope of the invention should not be restricted by the descriptions.

The evaluation methods used in the examples are as shown below.

Weight Average Molecular Weight

The weight average molecular weight (Mw) of the obtained polyhydroxycarboxylic acid was determined by gel permeation chromatography (GPC, column temperature at 40° C., in chloroform solvent), in comparison with a standard polystyrene sample.

Melting Point

The melting point of the polyhydroxycarboxylic acid is measured by a differential scanning calorimeter (Pyris1 model differential scanning calorimeter manufactured by Perkin Elmer Co.). Referring to the measuring conditions, a slice of 5 mg of a specimen taken from a central portion of a pellet of polyhydroxycarboxylic acid dried at 60° C. under a pressure of 5 mmHg for about 5 hours or more was sealed in a nitrogen atmosphere in an aluminum liquid pan, and the temperature for the endothermic peak detected upon temperature elevation at a rate of 10° C. from 20° C. is determined.

Example 1

Liquid Phase Polycondensation Steps 102.3 g of 88% L-lactic acid and 410 g of stannous oxide were charged in a drum of 0.5 m$^3$ volume equipped with a stirrer, the temperature was elevated from a room temperature to 160° C. in one hour under an ambient pressure nitrogen atmosphere and, after keeping at 160° C. for one hour, pressure was gradually reduced from the ambient pressure to 10 mmHg in two hours while maintaining the temperature at 160° C. and reaction was conducted, finally, at 160° C./10 mmHg for 10 hours. Mw was 10,000 in this case.

Pelleting Step

The molten polymer was supplied at 140 kg/Hr by way of a gear pump to a droplet pelleting machine ROTOFORMER 3,000 type (trade name of products manufactured by SANDVIK Co.). The pelleting machine had dropping outer shell width of 480 mm, the dropping nozzle diameter of 2.0 mm and the dropping nozzle pitch of 7 mm, and the shell temperature was 170° C. Further, the cooling belt had a belt width of 600 mm (effective width 480 mm), a belt length of 6.5 m (effective length: 6.0 m), with a belt cooling temperature at 20° C. and a belt speed of 8 m/min. Under the conditions described above, a molten polymer with a melting viscosity of 10 poise (supplied temperature at 70° C) could provide uniform polylactic acid particles at a particle temperature of 30° C., with a particle size of 3.5 mm, the standard deviation for the particle size of 0.4 mm and with the weight of 0.029 g/particle.

The exothermic peak area recognized upon temperature elevation analysis of the particle by using the differential scanning calorimeter was 35 J/g and the glass transition temperature was 42° C.

Crystallizing and Solid Phase Polycondensation Reaction Step

The polylactic acid pellets were supplied continuously to a reaction apparatus having a horizontal continuous heating vessel 2, a horizontal continuous heating vessel 3 and a solid phase polycondensation reaction vessel 4 to conduct crystallization and solid phase polycondensation.

Figure 3:
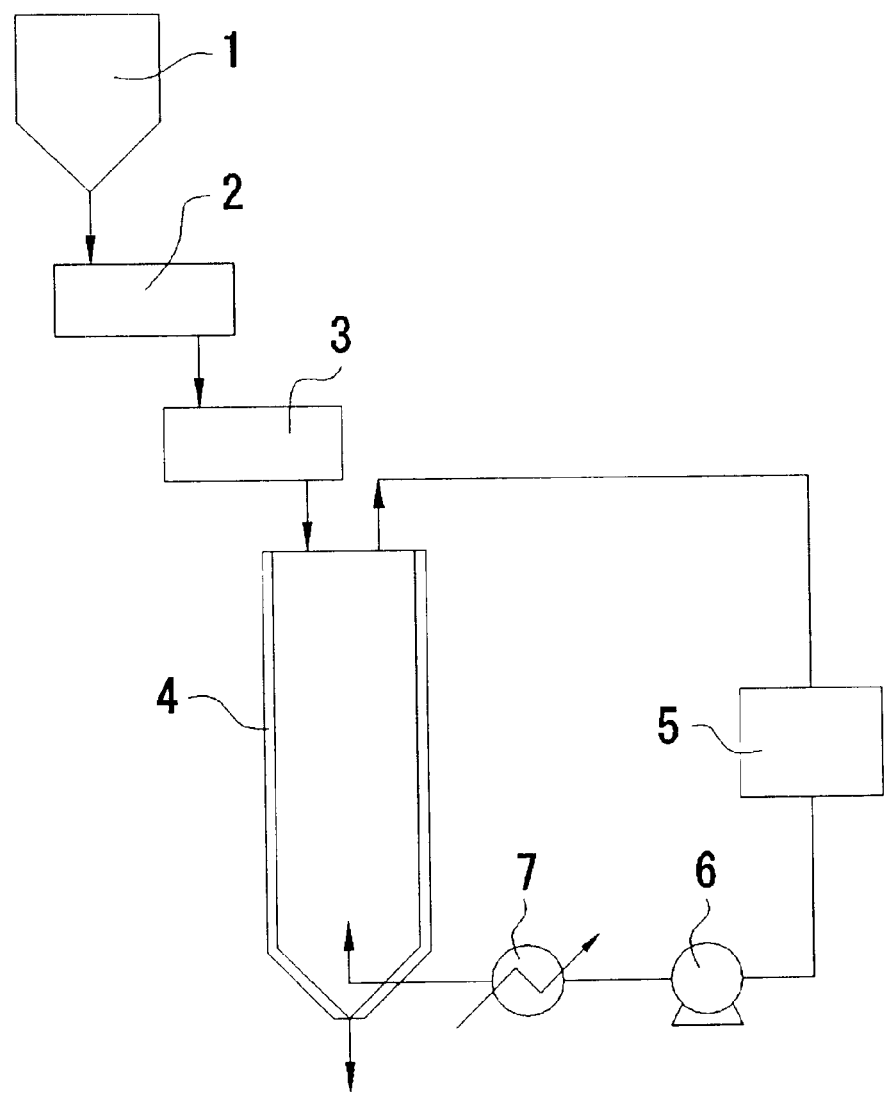
FIG. 3 is a conceptional view illustrating a heating apparatus used in examples.

In FIG. 3, are shown a feed hopper 1, a nitrogen cleaning device 5, a blower 6 and a heating device 7, respectively.

In the reaction apparatus, a step (A) of supplying pellets of polyhydroxycarboxylic acid from one side of the heating vessel and discharging the pellets of the polyhydroxycarboxylic acid under heating and stirring from the other side is conducted in the horizontal continuous heating vessel 2. In the horizontal continuous heating vessel 3, a step (B) of supplying the pellets of the polyhydroxycarboxylic acid by way of the step (A) from one side of the heating vessel and discharging the pellets of the polyhydroxycarboxylic acid under heating and stirring from the other side is conducted.

Pellets as the polylactic acid liquid phase polycondensates prepared by the method described above were supplied from one side of the horizontal continues heating vessel 2 and stirred while being heated to 70° C. The residence time in the step (A) was 40 min. The polylactic acid obtained by the step (A) had an exothermic peak area of 2 J/g and an endothermic peak area of 43 J/g when measured by the differential scanning calorimeter.

Then, the pellets of the polylactic-acid prepared in the step (A) were supplied to the horizontal heating vessel 3 and stirred while being heated to 130° C. The residence time in the step (B) was 30 min.

The polylactic acid obtained by the step (B) had an endothermic peak area of 48 J/g and an endothermic start temperature of 142° C.

The pellets of the polylactic acid obtained by the crystallizing step as described above were supplied to the solid phase polycondensation reaction vessel 4 and heated in the reaction vessel in a nitrogen atmosphere at 140° C. for 40 hours to conduct solid phase polycondensation reaction.

The weight average molecular weight of the polylactic acid obtained in the solid phase polycondensation reaction step was 140,000.

In each of the steps, the polylactic acid did not cause fusion and could be prepared efficiently.

Example 2

When the solid phase polycondensation reaction step in Example 1 reached 20 hr, the pellets of the polylactic acid were recovered from the solid phase polycondensation reaction vessel 4.

In this stage, the polylactic acid had an endothermic peak area of 60 J/g and an endothermic start temperature of 157° C. The pellets were again supplied to the solid phase polycondensation reaction vessel 4 and heated in a nitrogen atmosphere at 155° C. to conduct solid phase polycondensation.

The weight average molecular weight of the resultant polylactic acid was 152,000.

In each of the steps described above, the polylactic acid did not cause fusion and could be prepared efficiently.

Example 3

Pellets of liquid phase polycondensation products of polylactic acid having a weight average molecular weight of 20,000 were obtained in the same manner as in Example 1 except for changing the reaction time at 160° C., 10 mmHg in the liquid phase polycondensation reaction step to 14 hours in Example 1.

In the reaction apparatus shown in FIG. 3, pellets of the liquid phase polycondensation products of the polylactic acid prepared by the method described above were supplied from one side of the horizontal continuous heating vessel 2 and stirred while being heated to 90° C. The residence time in this step (A) was 20 min. The polylactic acid obtained by the step (A) had an exothermic peak area of 0 J/g and an endothermic peak area of 48 J/g as measured by a differential scanning calorimeter.

Then, the pellets of the polylactic acid prepared in the step (A) were supplied to the horizontal heating vessel 3 and stirred while being heated to 130° C. The residence time in the step (B) was 30 min.

The polylactic acid obtained by the step (B) had an endothermic peak area of 50 J/g and an endothermic start temperature of 145° C.

The pellets of the polylactic acid obtained by the crystallizing step as described above were supplied to the solid phase polycondensation reaction vessel 4 and heated in the reaction vessel in a nitrogen atmosphere at 140° C. for 40 hours to conduct solid phase polycondensation reaction.

The weight average molecular weight of the polylactic acid obtained in the solid phase polycondensation reaction step was 147,000.

In each of the steps, the polylactic acid did not cause fusion and could be prepared efficiently.

Comparative Example 1

The liquid phase polycondensation reaction was conducted in the same manner as in Example 1, to obtain a molten polylactic acid. After cooling to solidify the molten liquid, it was pulverized. The flowability of the resultant particles (powder) was poor.

The polylactic acid powder was heated at 70° C. for 90 min. to crystallize. The powder after crystallization formed fused lamps which could not flow.

The molten polylactic acid lamps were pulverized and heated at 140° C. in a nitrogen gas stream for 40 hours. Although the weight average molecular weight of the resultant polylactic acid was 128,000, powders were fused to each other and the particles (powder) could not flow.

Comparative Example 2

The pellets of the liquid phase polycondensation products of the polylactic acid prepared in the same manner as in Example 1 were put to solid phase polycondensation reaction by using the reaction apparatus shown in FIG. 2.

The pellets of the polylactic acid polycondensation products were supplied to the horizontal continuous heating vessel 2 and stirred while being heated to 40° C. The residence time in the step (A) was 20 min. The polylactic acid obtained by the step (A) had an exothermic peak area of 33 J/g and an endothermic peak area of 40 J/g as measured by the differential scanning calorimeter.

Then, when the pellets of the polylactic acid prepared in the step (A) were supplied to the horizontal heating vessel 3 and heated to 130° C., since the pellets were fused, heating in the subsequent steps was impossible.

Example 4

Polylactic acid particles were obtained in the same manner as in Example 1 except for conducting reaction at 160° C./10 mmHg for 15 hours in the solution polycondensation reaction step to obtain the polylactic acid of 150,000 Mw (melting viscosity: 15 poise, supplied temperature: 175° C.).

The resultant particles were at a particle temperature of 30° C. and uniform polylactic acid particles having a particle size of 4 mm, with the particle size standard deviation of 0.5 mm having a weight of 0.045 g/particle.

Example 5

The polylactic acid prepared in the same manner as in Example 1 was supplied at 120 kg/hr by way of a gear pump to a droplet pelleting machine ROTOFORMER 3,000 type (trade name of products manufactured by SANDVIK Co.). The pelleting machine has dropping outer shell width of 480 mm, the dropping nozzle diameter of 2.0 mm and the dropping nozzle pitch of 6 mm, and the shell temperature was 70° C. Further, the cooling belt had a belt width of 600 mm (effective width 480 mm), a belt length of 6.5 m (effective length: 6.0 m), with a belt cooling temperature at 20° C. and a belt speed of 11.6 m/min. Under the conditions described above, a molten polymer with a melting viscosity of 10 poise (supplied temperature at 70° C.) could provide uniform polylactic acid particles at a particle temperature of 25° C., with a particle size of 2.5 mm, the standard deviation for the grain size of 0.35 mm and with the weight of 0.012 g/particle.

Example 6

Liquid Phase Polycondensation Steps 102.3 g of 88% L/lactic acid and 410 g of stannous oxide were charged in a drum of 0.5 m³ volume equipped with a stirrer, the temperature was elevated from a room temperature to 160° C. in one hour under an ambient pressure nitrogen atmosphere and, after keeping at 160° C. for one hour, pressure was gradually reduced from the ambient pressure to 10 mmHg in two hours while maintaining the temperature at 160° C. and reaction was conducted, finally, at 160° C./10 mmHg for 10 hours. The average molecular weight of the polylactic acid was 10,000 and the melting point was 145° C. and the polylactic acid was used for the inner core portion in the pelleting step.

Further, 102.3 kg of 88% L-lactic acid and 410 g of stannous oxide were charged in a drum of 0.5 m³ inner volume equipped with a stirrer. The temperature was elevated in an ambient nitrogen atmosphere from room temperature to 140° C., and it was stirred under heating at 140° C. for 3 hours while distilling water out of the system. Then, Dean Stark trap incorporated with 72 kg of o-dichlorobenzene was disposed and 72 kg of o-dichlorobenzene was further added to a reaction mass and azeotropically dewatered at 140° C./270 mmHg for 4 hours. The DEANSTARK trap was detached, and a tube filled with 30 g of molecular sieve 3A and containing 54 kg of o-dichlorobenzene with a water content of 10 ppm or less was attached such that the solvent distilled out by reflux was returned again through the molecular sieve into the system and 144 kg of o-dichlorobenzene was further added to the reaction mass and stirred under heating at 140° C./270 mmHg for 8 hours such that water was not intruded into the system.

Subsequently, after cooling the reaction solution to 30° C. to crystallize the polymer, o-dichlorobenzene was distilled off at 60° C./10 mmHg and the polymer was dried in a nitrogen atmosphere. The polylactic acid had a weight average molecular weight of 66,000 and a melting point of 156° C. The polylactic acid was used as an outer coating portion in the pelleting step.

Pelleting Step

After melting the resin for the outer coating portion by a twin screw extruder at a cylinder temperature of 180° C. and melting a resin for the inner core portion by a single screw extruder at a cylinder temperature of 172° C., the discharge port of the single screw extruder was joined with a dice of the twin screw extruder and they were extruded as a strand into air, cooled in water and then pelleted by a strand cutter, to obtain pellets of a polylactic acid.

The feeding amount to the extruders was controlled such that the weight ratio of the polylactic acid between the outer coating portion and the inner core portion was 20:80.

Crystallizing, Solid Phase Polycondensation Reaction Step

The pellets of the polylactic acid were supplied continuously to a reaction apparatus having a horizontal continuous heating vessel 2, a horizontal continuous heating vessel 3 and a solid phase polycondensation reaction vessel 4 as shown in FIG. 3 to conduct crystallization and solid phase polycondensation.

In FIG. 3, are shown a feed hopper 1, a nitrogen cleaning device 5, a blower 6 and a heating device 7 respectively.

In the reaction apparatus, a step (A) of supplying pellets of polyhydroxycarboxylic acid from one side of the heating vessel and discharging the pellets of the polyhydroxycarboxylic acid under heating and stirring from the other side is conducted in the horizontal continuous heating vessel 2. In the horizontal continuous heating vessel 3. A step (B) of supplying the pellets of the polyhydroxycarboxylic acid by way of the step (A) from one side of the heating vessel and discharging the pellets of the polyhydroxycarboxylic acid under heating and stirring from the other side is conducted.

Pellets of the polylactic acid prepared by the method described above were supplied from one side of the horizontal continues heating vessel 2 and stirred while being heated to 70° C. The staying time in the step (A) was 40 min. Then, the pellets of the polylactic acid preparation in the step (A) were supplied to the horizontal heating vessel 3 and stirred while being heated to 140° C. The staying time in the step (B) was 20 min.

The pellets of the polylactic acid obtained by the crystallizing step as described above were supplied to the solid phase polycondensation reaction vessel 4 and heated in the reaction vessel in a nitrogen atmosphere at 140° C. for 40 hours to conduct solid phase polycondensation reaction.

The weight average molecular weight of the polylactic acid obtained in the solid phase polycondensation reaction step was 140,000.

In each of the steps, the polylactic acid did not cause fusion and could be prepared efficiently.

Comparative Example 3

Crystallizing and solid phase polycondensation reaction steps were conducted by using the same reaction apparatus as in Example 6, except for using pellets of polyhydroxycarboxylic acid consisting only of the inner core portion of Example 6.

That is, polylactic acid pellets were supplied to the horizontal continuous heating vessel 2 and stirred while being heated to 70° C. The feeding amount was controlled such that the staying time in the step (A) was 40 min. However, since the pellets were melted in the steps, heating in the succeeding step was impossible.

EFFECT OF THE INVENTION

According to the preparing process of the invention, polyhydroxycarboxylic acid of high molecular weight can be prepared efficiently without blocking or fusion of pellets of the polyhydroxycarboxylic acid of low molecular weight.

Further, according to the pelleting method of the invention, particles of the polyhydroxycarboxylic acid of low molecular weight with a uniform shape which can not be attained in the prior art process can be obtained. As a result, since handling of the particles becomes simple and convenient in the subsequent crystallizing step and the solid phase polycondensation reaction step, it is possible to obtain polyhydroxycarboxylic acid of high molecular weight at good productivity and reduced cost economically.

What is claimed is:

1. A process for preparing a polyhydroxycarboxylic acid of high molecular weight having a weight average molecular weight of 50,000 to 1000,000 comprising a crystallizing step of heating to crystallize a polyhydroxycarboxylic acid of low molecular weight obtained by way of a liquid phase polycondensation reaction step and a solid phase polycondensation reaction step of heating the same to a temperature not lower than crystallizing temperature, in which the crystallizing step comprises:

(A) a step of heating pellets of a polyhydroxycarboxylic acid having a weight average molecular weight of 2,000 to 100,000 under stirring at a temperature not lower than the glass transition point and not higher than the melting point, and heating the same till an exothermic peak area corresponding to the heat of crystallization is at most 10 J/g or less and an endothermic peak area corresponding to the heat of melting is 38 J/g or more as recognized upon conducting temperature elevation analysis of the polyhydroxycarboxylic acid by using a differential scanning calorimeter and, successively, (B) a step of heating to elevate the temperature of the polyhydroxycarboxylic acid to a temperature for the solid phase polycondensation reaction and the solid phase polycondensation reaction step comprises:

a step of conducting solid phase polycondensation of the polyhydroxycarboxylic acid at or lower than the endothermic start temperature of the endothermic peak recognized upon conducting temperature elevation analysis of the polyhydroxycarboxylic acid by using a differential scanning calorimeter.

2. A process for preparing polyhydroxycarboxylic acid having a weight average molecular weight of 50,000 to 1,000,000 according to claim 1, wherein the average grain size of the pellets of the polyhydroxycarboxylic acid before crystallization is within a range from 0.1 mm to 20 mm and the standard deviation of the particle diameter is within 1 mm.

3. A process for preparing polyhydroxycarboxylic acid having a weight average molecular weight of 50,000 to 1000,000 according to claim 1, wherein the pellets of the polyhydroxycarboxylic acid before crystallization are pellets of particulate polyhydroxycarboxylic acid prepared by melting a polyhydroxycarboxylic acid having a weight average molecular weight of 2,000 to 100,000, and dropping and cooling to solidify the molten polyhydroxycarboxylic acid having a melting viscosity of 0.01 to 100 poise.

4. A process for preparing polyhydroxycarboxylic acid having a weight average molecular weight of 50,000 to 1000,000 according to claim 2, wherein the pellets of polyhydroxycarboxylic acid before crystallization are pellets of particulate polyhydroxycarboxylic acid prepared by melting a polyhydroxycarboxylic acid having a weight average molecular weight of 2,000 to 100,000, dropping and cooling to solidify the molten polyhydroxycarboxylic acid with a melting viscosity of 0.01 to 100 poise.

5. A process for preparing polyhydroxycarboxylic acid having a weight average molecular weight of 50,000 to 1000,000 according to claim 3, wherein the melting temperature is from 140° C. to 200° C.

6. A process for preparing polyhydroxycarboxylic acid having a weight average molecular weight of 50,000 to 1000,000 according to claim 4, wherein the melting temperature is from 140° C. to 200° C.

7. A process for preparing polyhydroxycarboxylic acid having a weight average molecular weight of 50,000 to 1,000,000 according to claim 1, wherein pellets of the polyhydroxycarboxylic acid before crystallization are pellets comprising a inner core portion (I) and an outer portion (II) covering the inner core portion, in which the inner core portion (I) comprises a resin containing a polyhydroxycarboxylic acid having a weight average molecular weight (Mw) within a range from 2,000 to 30,000, the outer coating portion (II) comprises a resin containing a polyhydroxycarboxylic acid having a weight average molecular weight (Mw) of 30,000 to 100,000, the resin constituting the inner core portion has a melting point lower than that of the resin constituting the outer coating portion or shows no melting point.

8. A process for preparing polyhydroxycarboxylic acid having a weight average molecular weight of 50,000 to 1,000,000 according to claim 7, wherein the polyhydroxycarboxylic acid of low molecular weight is prepared from an aliphatic hydroxy-carboxylic acid.

9. A process for preparing polyhydroxycarboxylic acid having a weight average molecular weight of 50,000 to 1,000,000 according to claim 8, wherein the aliphatic hydroxy-carboxylic acid contains lactic acid.

10. A process for preparing polyhydroxycarboxylic acid having a weight average molecular weight of 50,000 to 1,000,000 according to claim 1, wherein the polyhydroxycarboxylic acid of low molecular weight is prepared from an aliphatic hydroxy-carboxylic acid.

11. A process for preparing polyhydroxycarboxylic acid having a weight average molecular weight of 50,000 to 1000,000 according to claim 10, wherein the aliphatic hydroxy-carboxylic acid contains lactic acid.

12. A process for preparing polyhydroxycarboxylic acid having a weight average molecular weight of 50,000 to 1,000,000 according to claim 2, wherein the polyhydroxycarboxylic acid of low molecular weight is prepared from an aliphatic hydroxy-carboxylic acid.

13. A process for preparing polyhydroxycarboxylic acid having a weight average molecular weight of 50,000 to 1000,000 according to claim 12, wherein the aliphatic hydroxy-carboxylic acid contains lactic acid.

14. A process for preparing polyhydroxycarboxylic acid having a weight average molecular weight of 50,000 to 1,000,000 according to claim 3, wherein the polyhydroxycarboxylic acid of low molecular weight is prepared from an aliphatic hydroxy-carboxylic acid.

15. A process for preparing polyhydroxycarboxylic acid having a weight average molecular weight of 50,000 to 1000,000 according to claim 14, wherein the aliphatic hydroxy-carboxylic acid contains lactic acid.

16. A process for preparing polyhydroxycarboxylic acid having a weight average molecular weight of 50,000 to 1,000,000 according to claim 4, wherein the polyhydroxycarboxylic acid of low molecular weight is prepared from an aliphatic hydroxy-carboxylic acid.

17. A process for preparing polyhydroxycarboxylic acid having a weight average molecular weight of 50,000 to 1000,000 according to claim 16, wherein the aliphatic hydroxy-carboxylic acid contains lactic acid.

18. A process for preparing polyhydroxycarboxylic acid having a weight average molecular weight of 50,000 to 1,000,000 according to claim 5, wherein the polyhydroxycarboxylic acid of low molecular weight is prepared from an aliphatic hydroxy-carboxylic acid.

19. A process for preparing polyhydroxycarboxylic acid having a weight average molecular weight of 50,000 to 1000,000 according to claim 18, wherein the aliphatic hydroxy-carboxylic acid contains lactic acid.

20. A process for preparing polyhydroxycarboxylic acid having a weight average molecular weight of 50,000 to 1,000,000 according to claim 6, wherein the polyhydroxycarboxylic acid of low molecular weight is prepared from an aliphatic hydroxy-carboxylic acid.

21. A process for preparing polyhydroxycarboxylic acid having a weight average molecular weight of 50,000 to 1000,000 according to claim 20, wherein the aliphatic hydroxy-carboxylic acid contains lactic acid.

* * * * *